(12) United States Patent
Son et al.

(10) Patent No.: US 10,554,504 B2
(45) Date of Patent: *Feb. 4, 2020

(54) METHOD FOR CHANGING USER-ORIGINATING INFORMATION THROUGH INTERACTION BETWEEN MOBILE DEVICE AND INFORMATION DISPLAY DEVICE

(71) Applicant: IPnology Ltd., Seoul (KR)

(72) Inventors: Byoung Chan Son, Seoul (KR); Byeong Ho Na, Seongnam-si (KR)

(73) Assignee: IPNOLOGY LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/971,006

(22) Filed: May 4, 2018

(65) Prior Publication Data
US 2018/0316575 A1 Nov. 1, 2018

Related U.S. Application Data

(63) Continuation-in-part of application No. 15/427,686, filed on Feb. 8, 2017, now Pat. No. 10,055,123, which
(Continued)

(30) Foreign Application Priority Data

Sep. 13, 2013 (KR) .................. 10-2013-0110727

(51) Int. Cl.
*H04L 12/58* (2006.01)
*H04L 12/24* (2006.01)
(Continued)

(52) U.S. Cl.
CPC .......... *H04L 41/22* (2013.01); *G06F 3/0482* (2013.01); *G06F 3/0484* (2013.01);
(Continued)

(58) Field of Classification Search
None
See application file for complete search history.

(56) References Cited

U.S. PATENT DOCUMENTS

2010/0291928 A1* 11/2010 Valdez ............. H04M 1/72505
455/436
2011/0055774 A1* 3/2011 Kim ....................... G06F 3/017
715/863
(Continued)

FOREIGN PATENT DOCUMENTS

KR 2013-0033485 A 4/2013
KR 10-1494894 B1 2/2015

*Primary Examiner* — Zewdu A Beyen
(74) *Attorney, Agent, or Firm* — Harness, Dickey and Pierce, P.L.C.

(57) ABSTRACT

A non-transitory computer-readable medium comprises computer readable instructions, which when executed, cause at least one processor of a mobile device of a user to (a) identify at least one communication device within a predetermined distance from the mobile device as a target to perform a specific interaction to change user-originating information, (b) establish a communication channel with the communication device, when a specified touch gesture is detected in the mobile device, (c) receive, from the communication device, data related to the specific interaction; and (d) transmit, to a server, the data related to the specific interaction.

21 Claims, 10 Drawing Sheets

Related U.S. Application Data is a continuation of application No. 14/686,365, filed on Apr. 14, 2015, which is a continuation-in-part of application No. 14/485,450, filed on Sep. 12, 2014, now Pat. No. 9,288,610.

(51) Int. Cl.

| | | |
|---|---|---|
| *G06F 3/0488* | (2013.01) | |
| *G06F 3/0484* | (2013.01) | |
| *H04M 1/725* | (2006.01) | |
| *G06Q 30/06* | (2012.01) | |
| *G06K 9/00* | (2006.01) | |
| *G06F 3/0482* | (2013.01) | |
| *G06Q 50/00* | (2012.01) | |
| *H04W 4/21* | (2018.01) | |
| *H04M 1/2745* | (2006.01) | |

(52) U.S. Cl.
CPC ....... *G06F 3/0488* (2013.01); *G06K 9/00013* (2013.01); *G06Q 30/0641* (2013.01); *G06Q 50/01* (2013.01); *H04M 1/72522* (2013.01); *H04M 1/72552* (2013.01); *H04W 4/21* (2018.02); *G06F 3/04883* (2013.01); *H04L 51/32* (2013.01); *H04M 1/274516* (2013.01); *H04M 1/7253* (2013.01); *H04M 2250/22* (2013.01)

(56) References Cited

U.S. PATENT DOCUMENTS

| | | |
|---|---|---|
| 2012/0178369 A1 | 7/2012 | Kim |
| 2013/0060708 A1 | 3/2013 | Oskolkov et al. |
| 2013/0128755 A1* | 5/2013 | Ullah ................. G01S 5/02 370/252 |
| 2013/0169571 A1 | 7/2013 | Gai et al. |
| 2013/0219303 A1 | 8/2013 | Eriksson et al. |
| 2013/0232197 A1 | 9/2013 | Shin et al. |
| 2014/0279508 A1* | 9/2014 | Karamchedu ...... G06Q 20/3224 705/44 |
| 2015/0324858 A1* | 11/2015 | DeMattei ................ H04L 51/08 705/14.64 |
| 2018/0053226 A1* | 2/2018 | Hutton ................. G06Q 20/18 |

* cited by examiner

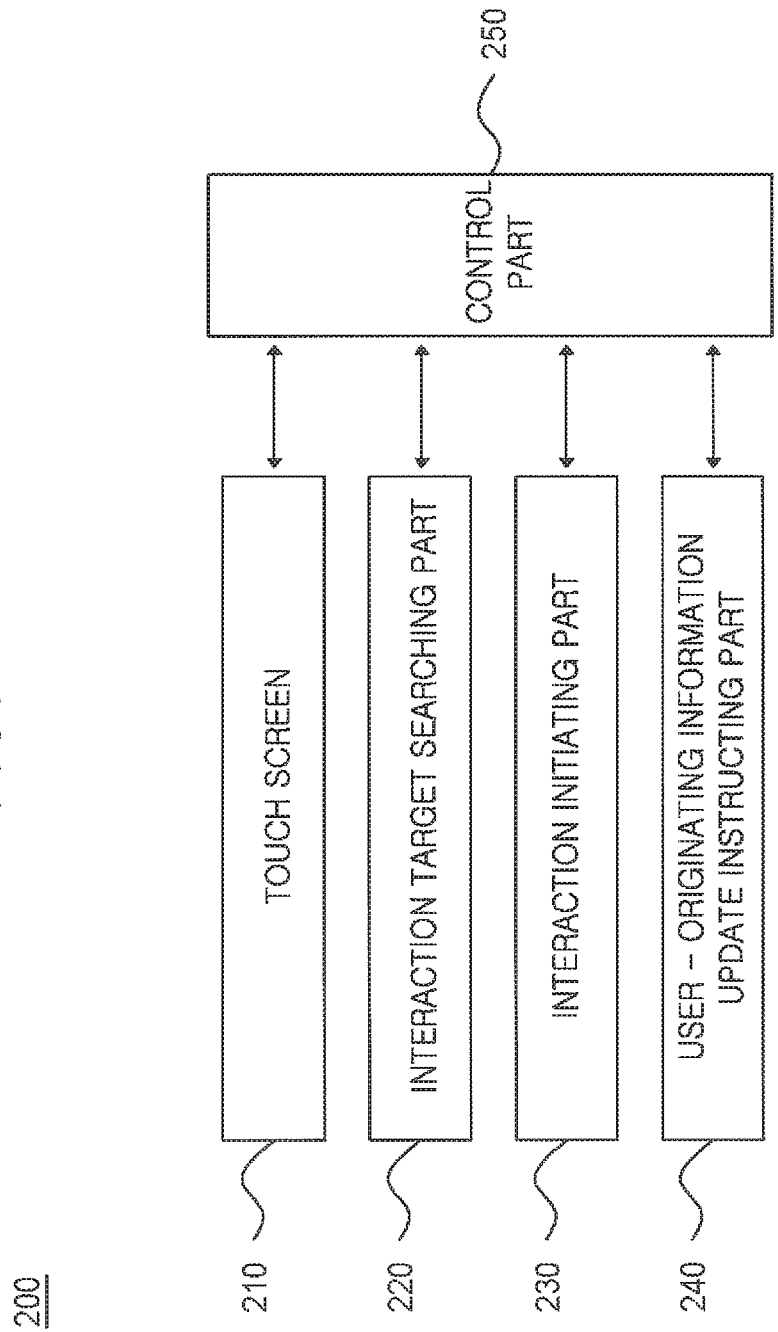

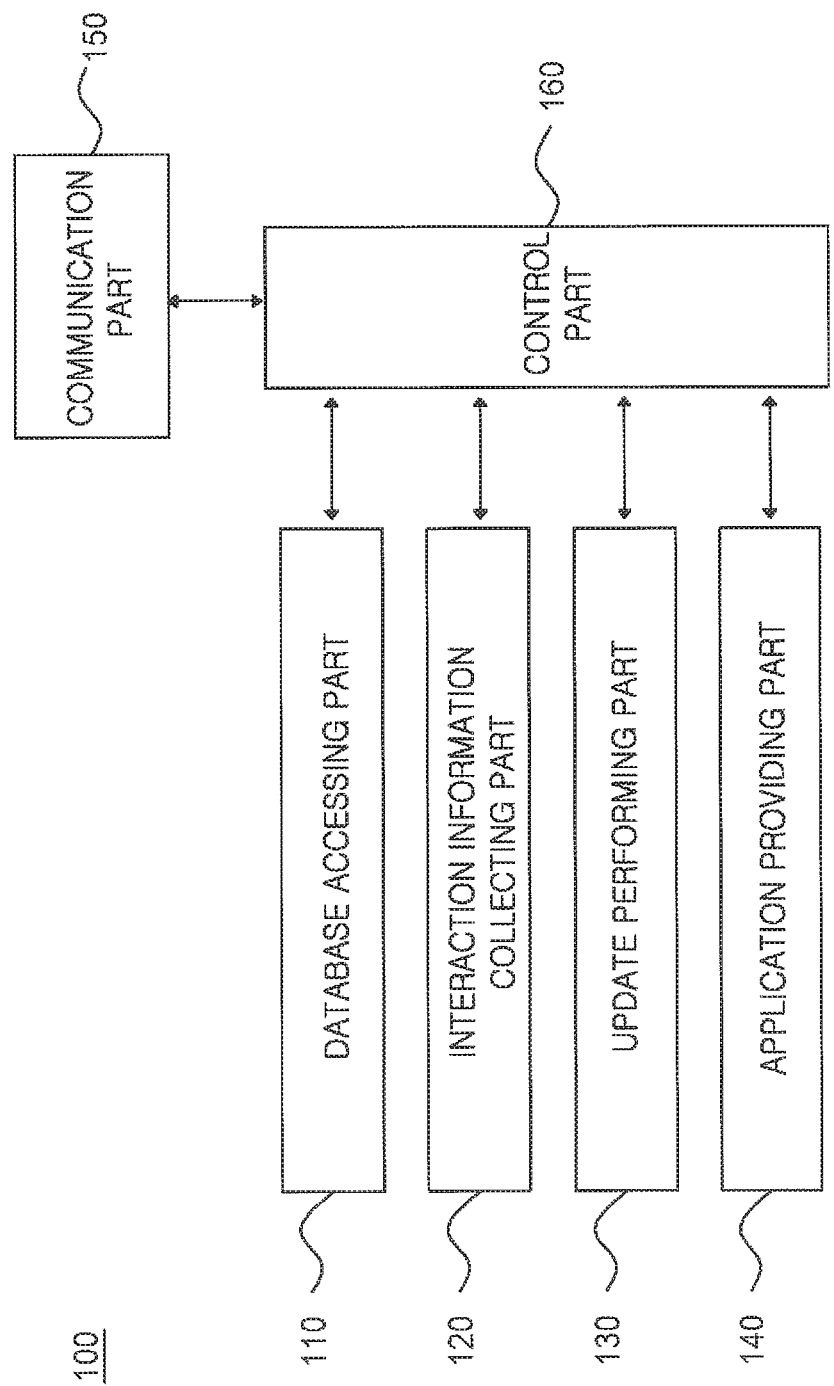

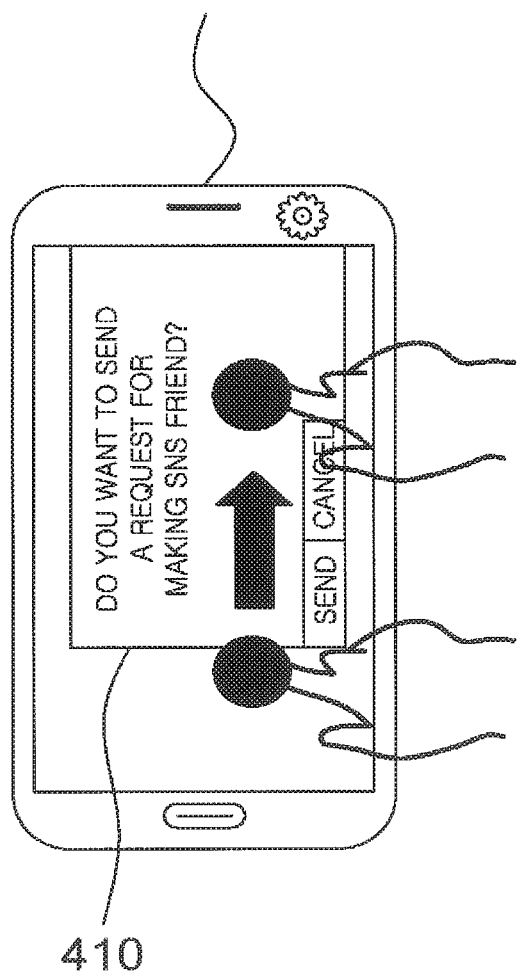

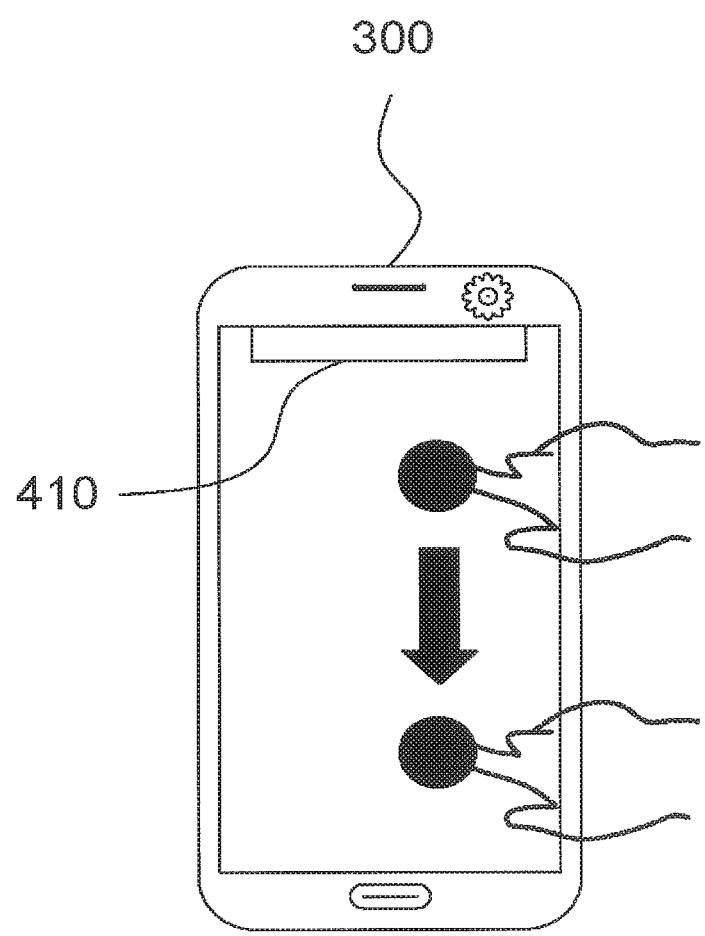

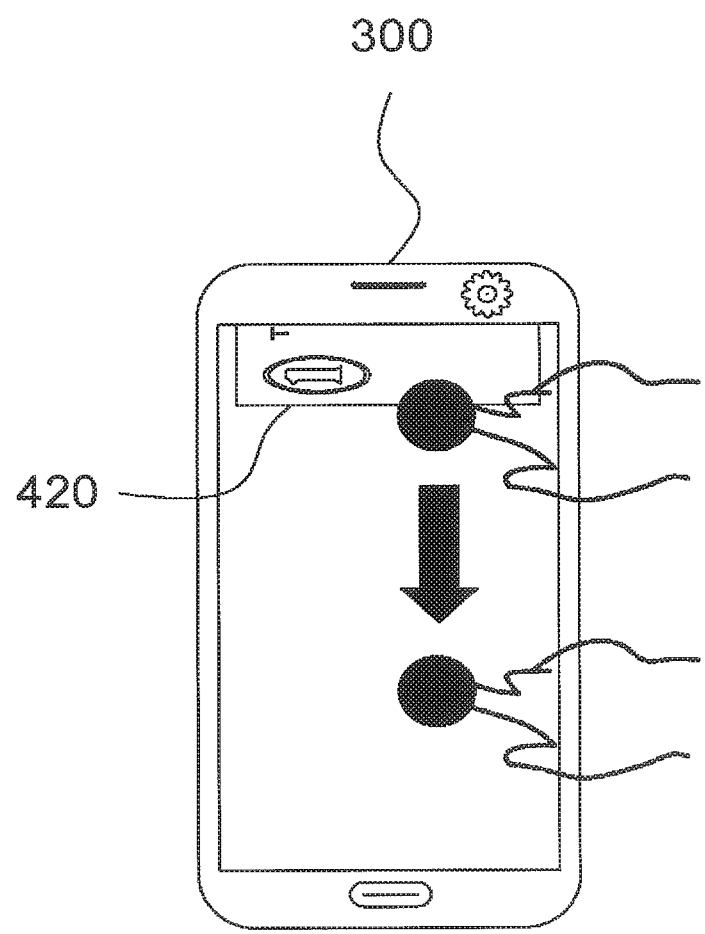

METHOD FOR CHANGING USER-ORIGINATING INFORMATION THROUGH INTERACTION BETWEEN MOBILE DEVICE AND INFORMATION DISPLAY DEVICE

CROSS-REFERENCE TO RELATED APPLICATIONS

This is a continuation-in-part of U.S. application Ser. No. 15/427,686, filed Feb. 8, 2017, which is a continuation of U.S. application Ser. No. 14/686,365, filed Apr. 14, 2015, which is a continuation-in-part of U.S. application Ser. No. 14/485,450, filed Sep. 12, 2014, which claims the benefit of Korean Application No. 10-2013-0110727, filed Sep. 13, 2013, in the Korean Intellectual Property Office. All disclosures of the documents named above are incorporated herein in their entireties by reference.

BACKGROUND

1. Field

Example embodiments relate to a method for changing user-originating information through interactions with other users, a non-transitory computer readable medium, and/or an apparatus configured to perform the same. For example, at least some example embodiments relate to a method for changing user-originating information by searching a second mobile device of a second user as a target for performing a specific interaction with a first user of a first mobile device within a desired (or, alternatively, a predetermined) distance from the location of the first mobile device, transmitting to, or receiving from, the second mobile device data related to a specific interaction if a specified touch gesture is detected by the first mobile device, and allowing a server to update the information originating from at least either of the first and the second users.

2. Description of the Related Art

Recently as smart devices have been widely used, users of the smart devices increasingly perform interactions through the smart devices. Smart device users perform interactions, including giving or receiving gifts with others or carrying out financial transactions, by using smart devices.

In particular, building relationships with others or growing personal connections in social networks may be examples of interactions that may be performed by using such smart devices. To build relationships with others and grow personal connections in social networks, users of social network service (SNS) may send so-called "friend requests" to others, which may be accomplished through a cumbersome procedure. For example, the user may have to search a name (or nickname) of other person whom they want to build relationships with, click or touch a button, send a message of friend request to the person and then wait for the person's acceptance. However, it may be difficult for users who are not familiar with SNS to perform such procedure.

SUMMARY

Example embodiments may provide solutions to the problems mentioned above.

At least some example embodiments are directed to searching a mobile device of the other person to perform an interaction with a user's mobile device without any complicated procedure.

At least some example embodiments are directed to updating user-originating information relating to the other person only with simple user interface very easily by updating the user-originating information recorded in a server or a database interacted with the server if a gesture of the user's swiping gesture to an image displayed on the mobile device is detected as a specified touch gesture. At least some example embodiments are directed to omitting cumbersome procedures including the user's finding the other user under the name of the other user on the SNS, selecting the other person among searched different persons with the same name, sending a friend request, etc. and allow an interaction to be intuitively performed because the interaction is available as long as the application installed in the mobile devices of the user and the other user is turned on. At least some example embodiments are directed to allowing the interaction between mobile devices to be available as long as an application installed in the mobile devices is turned on, if a financial transaction between the user and the other user is carried out, and allow the financial transaction to be carried out just with a simple swipe gesture (even though both mobile devices are not physically contacted or nearly contacted with each other).

In accordance with an example embodiment, there is provided a non-transitory computer-readable medium including computer readable instructions, which when executed, cause at least one processor of a mobile device of a user to execute an application program in one of a background and foreground of the mobile device to, identify at least one communication device within a first distance from the mobile device as a target to perform a specific interaction to change user-originating information, establish a communication channel with the communication device in response to detection of a specified touch gesture on a screen associated with the mobile device, receive, from the communication device, data related to the specific interaction in response to the user providing an input to the communication device, and transmit, to a server, the data related to the specific interaction to instruct the server to update user information stored in the server or a storage device interacted with the server based on the data related to the specific interaction.

In accordance with an example embodiment, there is provided a mobile device including a memory configured to store an application program; and at least one processor configured to execute the application program in one of a background and foreground of the mobile device to, identify at least one communication device within a first distance from the mobile device as a target to perform a specific interaction to change user-originating information, establish a communication channel with the communication device in response to detection of a specified touch gesture on a screen associated with the mobile device, receive, from the communication device, data related to the specific interaction in response to a user providing an input to the communication device, and transmit, to a server, the data related to the specific interaction to instruct the server to update user information stored in the server or a storage device interacted with the server based on the data related to the specific interaction.

In accordance with an example embodiment, there is provided a method of operating a mobile device, the mobile device including at least one processor to execute an application program in one of a background and foreground of the mobile device, the method including identifying at least one communication device within a first distance from the mobile device as a target to perform a specific interaction to change user-originating information, establishing a communication channel with the communication device in response to detection of a specified touch gesture on a screen associated with the mobile device, receiving, from the communication device, data related to the specific interaction in response to a user providing an input to the communication device, and transmitting, to a server, the data related to the specific interaction to instruct the server to update user information stored in the server or a storage device interacted with the server based on the data related to the specific interaction.

Additional aspects and/or advantages of the example embodiments will be set forth in part in the description which follows and, in part, will be obvious from the description, or may be learned by practice of the example embodiments.

BRIEF DESCRIPTION OF THE DRAWINGS

The above and other objects and features of the example embodiments will become apparent from the following description of some example embodiments given in conjunction with the accompanying drawings, in which:

FIG. 2 is a drawing showing the internal configuration of the mobile device in accordance with one example embodiment.

FIG. 3 is a drawing representing the internal configuration of a server to change user-originating information on at least either of the first user and the second user with the support of a first mobile device of the first user and a second device of the second user in accordance with an example embodiment.

FIGS. 4A and 4B are exemplary drawings to explain the performance of the interaction between a user and the other user in accordance with a first example embodiment.

FIGS. 5A and 5B are exemplary drawings to explain the performance of the interaction between the user and the other user in accordance with a second example embodiment.

DETAILED DESCRIPTION

Figure 1:
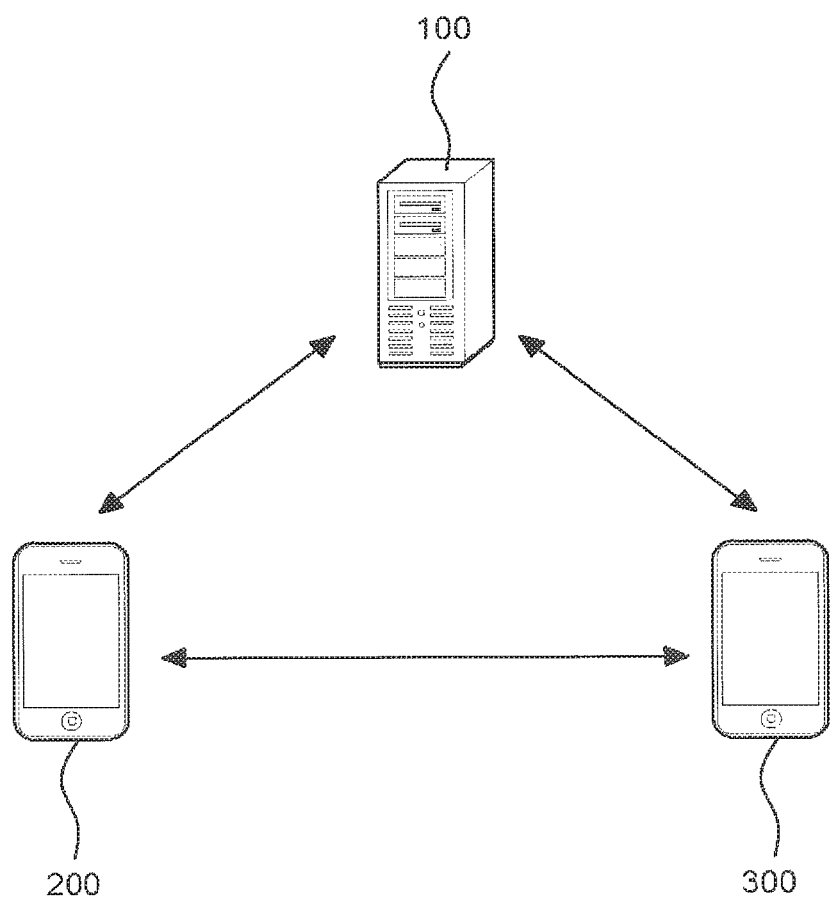
FIG. 1 is a drawing illustrating the brief configuration of the whole system to change information originating from at least either of a first user and a second user by using a mobile device through an interaction with others in accordance with an example embodiment.

The detailed description of example embodiments illustrates specific example embodiments with reference to the attached drawings.

In the following detailed description, reference is made to the accompanying drawings that show, by way of illustration, specific example embodiments. These example are described in sufficient detail to enable those skilled in the art to practice the example embodiments. It is to be understood that the various example embodiments, although different, are not necessarily mutually exclusive. For example, a particular feature, structure, or characteristic described herein in connection with one embodiment may be implemented within other embodiments without departing from the spirit and scope of the example embodiments. In addition, it is to be understood that the location or arrangement of individual elements within each disclosed example embodiment may be modified without departing from the spirit and scope of the example embodiments. The following detailed description is, therefore, not to be taken in a limiting sense, and the scope of the example embodiments defined only by the appended claims, appropriately interpreted, along with the full range of equivalents to which the claims are entitled. In the drawings, like numerals refer to the same or similar functionality throughout the several views.

The example embodiments will be described by referring to attached diagrams in detail as follows:

Whole System

FIG. 1 illustrates the brief configuration of the whole system to automatically change information originating from at least either of a first user and a second user by using mobile devices in accordance with an example embodiment. The "information originating from a user" or "user-originating information" will be explained later.

As illustrated in FIG. 1, the whole system in accordance with an example embodiment may include a server 100, a communication network (non-illustrated), the first user's first mobile device 200 and the second user's second mobile device 300. For reference, the first user and the second user may be described as the terms "a user" and "the other user", respectively, herein.

First of all, the communication network may be implemented to either wired or wireless network. The communication network may include a wide area network (WAN), a local area network (LAN), a telecommunication network, an artificial satellite communication network, and other diverse networks. More preferably, the communication network may be wireless communication networks implemented by technologies such as IEEE 802.11, Code Division Multiple Access (CDMA), Wideband Code Division Multiple Access (WCDMA), Global System for Mobile communications (GSM), and Long Term Evolution (LTE). However, the communication network may also include at least part of a publicly known wired and wireless data communication network, a publicly known telephone network, or publicly known wired and wireless television networks without being limited only to these.

Next, the server 100 may receive data related to an interaction to be performed between the first user as owner of the first mobile device 200 and the second user as owner of the second mobile device 300 from at least either of the first mobile device 200 and the second mobile device 300 through the communication network. By referring to the data related to the interaction, it may update information originating from the first user or the second user stored in a database (non-illustrated).

Herein, the user-originating information may include information on lists of Social Network Service (SNS) friends, financial account balances or transactions, address books, coupons, etc. of the first user and the second user.

Lastly, the first mobile device 200 and the second mobile device 300 may be digital devices which are capable of communicating between the first mobile device 200 and the second mobile device 300 and/or accessing the server 100 and then communicating with it. Such digital devices, may include a mobile phone (particularly, smart phone), a tablet PC, a laptop, etc., with touch panels.

The detailed explanation on configurations and functions of the mobile devices 200 and 300 and the server 100 will be made.

Configurations of Mobile Devices of the Users

Internal configurations of the mobile devices in accordance with example embodiments and functions of their components will be explained.

FIG. 2 is a drawing showing the internal configuration of the mobile device of the user (i.e., the first user) which performs a specific interaction with that of the other user (i.e., the second user) to change information originating from the user or the other user who has a relationship with the user.

As illustrated in FIG. 2, the mobile device 200 may be configured, including a touch screen 210, a memory (not shown) and processing circuitry (not shown). The processing circuitry may be, but not limited to, a processor, Central Processing Unit (CPU), a controller, an arithmetic logic unit (ALU), a digital signal processor, a microcomputer, a field programmable gate array (FPGA), an Application Specific Integrated Circuit (ASIC), a System-on-Chip (SoC), a programmable logic unit, a microprocessor, or any other device capable of performing operations in a defined manner. The processing circuitry may be configured, through a layout design or execution of computer readable instructions stored in a memory (not shown), as a special purpose computer to perform the functions of, for example, an interaction target searching part 220, an interaction initiating part 230, a user-originating information update instructing part 240, a communication part (non-illustrated), and a control part 250, discussed below.

First, the touch screen 210 may perform a function of receiving a touch gesture from the user. The touch screen 210 reads a touch position of the user. The control part 250 may determine a type of touch gesture, e.g., tap, long-press, drag, or swipe gestures, by using the read touch position. An interaction between the user's mobile device 200 and the other user's mobile device 300 may be performed depending on a position or a type of the entered touch gesture.

Next, the interaction target searching part 220 may perform a function of searching the other user's mobile device 300 as a target for the specific interaction with the user's mobile device 200 within a desired (or, alternatively, a predetermined) distance from the location of user's mobile device by using a variety of location determination technologies including global positioning system (GPS), Wi-Fi Positioning System (WPS), or Cell ID (CID).

In this case, if the user (i.e., the first user) turns on a certain application program in his or her mobile device while same kind of application programs to the certain application program are run under the background state (or foreground state) in respective mobile devices of the other users (i.e., the second users) and regularly transmit the respective locations of the mobile devices of the other users to the server 100, the information on the other users around the first user will be collected and transmitted to the user's mobile device by the server 100. After that, if the user selects at least one of the second users, a message may be allowed to be pushed to the selected second user's mobile device and if the selected second user selects (e.g., clicks) the message through the touch screen of his or her mobile device, the application program in the selected second user's mobile device may be automatically executed and then the first user's mobile device and the selected second user's one may be at a communicable state. If there is any second user's mobile device whose application is turned on (i.e., awake from the background state) among the second users' mobile devices, the first and the second user's mobile devices may be automatically communicable without any transmission of the pushed message.

Besides, the interaction target searching part 220 may perform a function of searching second users' devices connected to a local area network, i.e., an AP or Wi-Fi ad-hoc network which the first user's mobile device has accessed. In case of the local network using AP or the network using the Wi-Fi ad-hoc mode, the first user's mobile device 200 may transmit a query inquiring whether an application program in accordance with example embodiments is installed to all the second users' mobile devices connected to the AP or the ad-hoc network in a form of multicast or broadcast. Among the second users' mobile devices connected to the AP or the ad-hoc network, one or more second users' mobile devices where the application program is installed or running may transmit information on whether installed or not with information on the respective second mobile devices by responding to the query. This example embodiment was explained on assumption that whether the application program is installed or not is inquired as a query, but it is not limited to this. For example, the user's mobile device 200 may inquire general information on the other user's mobile device 300 (e.g., "who are you," etc.) as a query, and may also receive information on identifiers (e.g., mobile phone number, UUID, etc.), IP address, MAC address, or possible financial transactions of the mobile device, whether to install and/or run an application for financial transactions, etc. as a response thereto.

In addition, the interaction target searching part 220 may search the other user's mobile device 300 which may be directly connected wirelessly with the user's mobile device 200 through Bluetooth, Wi-FI Direct, etc. For instance, in case of direct wireless connection between mobile devices through Bluetooth, Wi-Fi Direct, etc., the user's mobile device 200 may know whether it could be directly connected with neighbor mobile devices within a desired (or, alternatively, a predetermined) distance, e.g., signal transmission coverage, and whether the application program in accordance with example embodiments has been installed therein. For example, if the user's mobile device 200 searches the other users' mobile devices 300 with which the user's mobile device 200 can directly connect wirelessly around itself, the searched mobile devices 300 may provide information on the ID thereof and available service information, e.g., information on whether the application program is installed, for the user's mobile device 200. The user's mobile device 200 may select a specific second user's mobile device 300 to interact with among the searched mobile devices 300 by using the provided information on the ID and the available service information. Even if direct connection between devices is implemented in the fifth-generation (5G) mobile communication in the future, it is made clear that the example embodiments may be implemented through the 5G mobile communication.

More preferably, if there are multiple mobile devices 300 searched to have the installed application program in accordance with example embodiments therein (or searched based on particular information received as a response to the query) through the interaction target searching part 220, the user's mobile device 200 may automatically select a certain mobile device where the application program is turned on among the searched mobile devices to perform an interaction with the certain mobile device. In other words, without going through separate connection/approval procedures for the wireless connection between both mobile devices, as long as each application installed in both the first user's and the second user's mobile devices is turned on, the both mobile devices are at the wirelessly connectible state. In this case, user convenience is improved because the probability of unnecessarily interacting with the other user's mobile device 300 which does not want to communicate, i.e., the mobile device 300 where the application is not turned on, is reduced. The interaction target searching part 220 may determine whether the application is turned on by acquiring the signal transmitted by the application. At the time, the application program may be a program to perform the specific interaction.

It is noted that the interaction target searching part 220 could also be implemented to provide a list including information on the at least one specific second user's mobile device to perform interactions to the first user's mobile device even if the application program is installed but is not turned on in the at least one specific second user's mobile device.

If there are multiple second users' mobile devices where the application programs in accordance with example embodiments are turned on among the searched second users' mobile devices, the interaction target searching part 220 may allow the list of the second users' mobile devices in which the application programs in accordance with example embodiments are turned on to be displayed on the first user's mobile device 200. In this case, the user may select a target to perform the specific interaction with among the second users' mobile devices whose information is displayed on the first user's mobile device 200 to thereby establish a connection with the target. If there is only one second user's mobile device in which the application is turned on, the first user's mobile device could select the second user's one automatically as a target for interaction without any entry of the user, of course.

At the time, the interaction target searching part 220 may also allow information on the target, i.e., the selected the other user's mobile device 300, to be displayed on the user's mobile device 200 to make the user check whether the other user's mobile device 300 selected as specified above is the appropriate target to perform the interaction.

More desirably, the user's mobile device 200 may turn on the capability of transmitting and receiving a wireless signal together with turning on the application program in accordance with the example embodiments n to enable the search function of the interaction target searching part 220.

Next, if the specified touch gesture of the user is detected through the touch screen 210 and the control part 250, the interaction initiating part 230 may perform a function of transmitting or receiving data related to the specific interaction to or from the other user's mobile device 300 searched and selected by the interaction target searching part 220. The data related to the specific interaction may play a role as a triggering signal for triggering a change of the information originating from the user or the other user. And the data related to the specific interaction may include (i) data immediately required to change the information originating from the user or the other user (so-called "actual data") such as data on the SNS account of the user or the other user, financial account information (account number, balance and the like), or transaction amount, or (ii) a signal for simply declaring an intention, which is not the actual data (e.g., instruction defined between the mobile devices). Detailed explanation of (i) actual data to change the information originating from the user or the other user, or (ii) the signal for simply declaring the intention that could be included in the data related to the specific interaction will be given.

The specific interaction may be at least one of interactions for making a SNS friend, performing a financial transaction, giving and receiving contact numbers, and giving a coupon as a gift and proper data could be transmitted or received depending on types of interactions, i.e., types of the user-originating information to change.

More specifically, in accordance with a first example embodiment, the user may perform the interaction to make SNS friends with the other user. In this case, if a specified touch gesture is detected, information on the SNS account of the user or the other user (i.e., the actual data), as data related to the specific interaction, may be transmitted. It is noted that information may be not on the SNS account of the user or the other user. In this case, the signal for simply declaring the intention to update the information on the list of SNS friends could be transmitted as data. The signal for simply declaring the intention could be just the declaration of the intention of "wanting to interact" of the user or the other user and just the entry of a specified touch gesture through the mobile device of the user or the other user could be treated to be the entry of such a signal for simply declaring the intention. By referring to the data related to the specific interaction, the user-originating information update instructing part 240 to be explained below may instruct the server 100 to update the information originating from the user or the other user. Even though information on a certain SNS where the user wants to be SNS friends with the other user among multiple SNS such as facebook, twitter, and Linkedin and information on the SNS accounts of the first user and the second user is not transmitted between the user's mobile device 200 and the other user's mobile device 300, if the signal for simply declaring the intention to update the list of SNS friends is transmitted as the data related to the specific interaction, the server 100 may be instructed to update the list of SNS friends by receiving the information on the certain SNS where the user wants to be SNS friends with the other user among the multiple SNS and the information on the SNS accounts of the first user and the second user from the mobile devices 200 and 300 of the user and the other user.

The user may interact with the other user for a financial transaction. In this case, if a specified touch gesture is detected, the actual data such as transaction amounts, and financial account information of the user or the other user as the data related to the specific interaction may be transmitted between the user's mobile device and the other user's. Of course, only the signal for simply declaring the intention of wanting the financial transaction might be transmitted as the data related to the specific interaction. If the signal for simply declaring the intention of wanting the financial transaction is transmitted, even though the data such as, transaction amount, financial account number of the user or the other user, balance, a type of institution supporting the financial transaction is not directly transmitted between the user's mobile device 200 and the other user's mobile device 300, the server 100 may be instructed to update the balance or transactions of the financial account of at least either of the user or the other user by receiving the actual data such as the transaction amount, the financial account number of the user or the other user, the balance, the type of institution supporting the financial transaction from the mobile devices 200 and 300 of the user and the other user.

In the past, a financial transaction by using a smart device was nothing but simply transferring money from a bank or insurance account of the user to the account of the other user. To perform this, it the user may conduct the financial transaction through complicated procedures after logging in the bank account by using an application supported by the user's bank. In case of a digital wallet payment service by using the near field communication (NFC), it may be difficult to search a mobile device which might perform the digital wallet service because the operable scope was very narrow and it was inconvenient to place a mobile device physically close to another mobile device. Besides, the user may not be able to enjoy convenience of automatic connection between two mobile devices wherein the automatic connection is established as long as the application is turned on in both mobile devices. In accordance with the example embodiments, the financial transaction between the user and the other user is available because they become wirelessly connected with each other as long as the application installed, respectively, in both mobile devices is turned on, even though both mobile devices are not physically contacted.

The user may perform an interaction for giving and receiving a contact number with the other user. At the time, if a specified touch gesture is detected to have been entered in the user's mobile device 200, information on a business card of at least either of the user or the other user as data related to the specific interaction (i.e., the actual data) may be transmitted or the signal for simply declaring the intention to update an address book may be transmitted.

The user may perform an interaction for giving to, and receiving from, the other user a coupon. In this case, if a specified touch gesture is detected to have been entered in the user's mobile device 200, information on a type of coupon and information on the user or the other user as data related to the specific interaction (i.e., the actual data) may be also transmitted or the signal for simply declaring the intention to update coupon information may be transmitted.

Lastly, the user may perform an interaction for an on-line shopping experience. For the user who is watching a shopping channel on the information display device 500 such as a smart TV including a setup box, for example, if a specified touch gesture is detected to have been entered in the user's mobile device 200, information on product, price, consumer review/rating, and seller as data related to the specific interaction (i.e., the actual data) may be transmitted or the signal for simply declaring the intention to update shopping information may be transmitted. If the signal for simply declaring the intention of wanting the shopping is transmitted, even though the actual data is not directly transmitted between the user's mobile device 200 and the information display device 500, the server 100 may be instructed to update the shopping-related data of the user by receiving the actual data from the mobile device 200 or the information display device 500.

The specified touch gesture as displayed on the user's mobile device 200 may be a gesture of swiping an image corresponding to the data related to the specific interaction to a first direction. Herein, the first direction may be a direction of taking a gesture of pulling the image out of the mobile device 200 but it is not limited to this.

Meanwhile, the image displayed on the user's mobile device 200 may depend on a type of interaction. For example, in case of an interaction for making a SNS friend, an image to be displayed may include the data related to the SNS account of the user (e.g., an image on which a profile photo, name, nickname, etc. of the user of the other user on the SNS or a business card-shaped image). In case of an interaction for conducting a financial transaction, the image may be a shape of bill. In case of giving and receiving a contact number, the image may be a shape of business card of the user of the other user. In case of an interaction for giving and receiving a coupon, it may be a coupon-shaped image. Herein the coupon-shaped image may include text information as the case may be. In case of an interaction for on-line shopping, it may be a product-shaped image.

In brief, if the user enters a gesture of swiping an image corresponding to the data related to the specific interaction to the first direction, the data defined above is transmitted to the other user's mobile device 300 and an image corresponding to the data may be displayed on the other user's mobile device 300. Herein, it was explained on assumption that the data is transmitted from the user's mobile device 200 to the other user's mobile device 300, but conversely the data could be transmitted from the other user's mobile device 300 to the user's mobile device 200.

The interaction initiating part 230 may perform a function of certifying a particular user. In the interaction for a financial transaction, security is important because the information originating from the user or the other user may be updated only with the signal for simply declaring the intention to update the information. Security may be enhanced by checking whether the touch gesture is made by the user himself or herself. At the time, the user may be certified by using a fingerprint recognition module. A fingerprint may be recognized by using a fingerprint recognition sensor embedded or attached in the mobile device and by using either of a swipe type sensor for swiping a finger on the fingerprint recognition sensor or an area type sensor for touching whole area of the finger at once. The touch gesture and fingerprint of the user may be recognized at the same time by using the touch panel of the mobile device as a fingerprint recognition module as well.

Next, the user-originating information update instructing part 240 may perform a function of instructing the server 100 to update information originating from at least either of the user and the other user stored therein or a storage device interacted therewith by referring to the data related to the specific interaction transmitted or received by the interaction initiating part 230. For reference, the information originating from the user and the other user stored in the server 100 or the storage device interacted therewith is explained to be identical to the information originating from the first and the second users stored in user-originating information database to be described later.

The user-originating information update instructing part 240 instructs the server 100 to update information originating from at least either of the user or the other user. And the server 100 may receive the data related to the specific interaction through an interaction information collecting part 120 which will be explained later and instruct the information originating from at least either of the user or the other user to be updated by referring to the received data.

More specifically, if a specified tough gesture is detected in the first mobile device 200 and the data related to the specific interaction is transmitted to the second mobile device 300, the interaction information collecting part 120 may receive data related to the specific interaction from the second mobile device 300. For example, in case of the interaction for making a SNS friend, information on a certain SNS where the user wants to be SNS friends with the other user among multiple SNS's such as facebook, twitter, and Linkedin and information on the SNS accounts of the first user and the second user may be included. Conversely, if the first mobile device 200 receives the data related to the specific interaction, the interaction information collecting part 120 may receive the data related to the specific interaction from the first mobile device 200. Besides, if the specified touch gesture is detected in the first mobile device 200 and the signal for simply declaring the intention is transmitted to the second mobile device 300 to update the user-originating information, the interaction information collecting part 120 may receive the data related to the specific interaction, respectively, from the first mobile device 200 and the second mobile device 300.

The user-originating information update instructing part 240 may instruct the information originating from the user or the other user to be updated when the specified touch gesture is detected in the user's mobile device 200 or when the specified touch gesture entered in the other user's mobile device 300 is detected as a signal of transmitting and receiving the data, as the case may be.

At the time, the touch gesture, detected as the signal of transmitting and receiving the data, inputted through the other user's mobile device 300 may be a gesture of swiping an image corresponding to the data related to the specific interaction to a second direction. The second direction may be a direction showing that the other user fully draws the image partially displayed on the mobile device 300 into the other user's own mobile device, but it is not limited to this. While the first direction intends to intuitively express that the images of "making a SNS friend", a bill, a business card, a coupon, etc. are transmitted to the other user, the second direction may be considered to intuitively express that the aforementioned images are received.

Figure 5A:
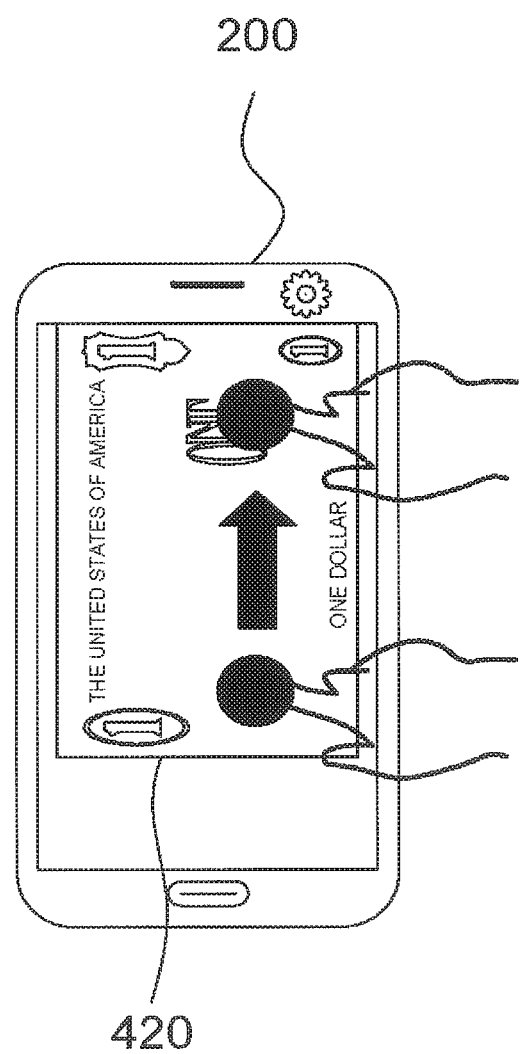
Figure 6:
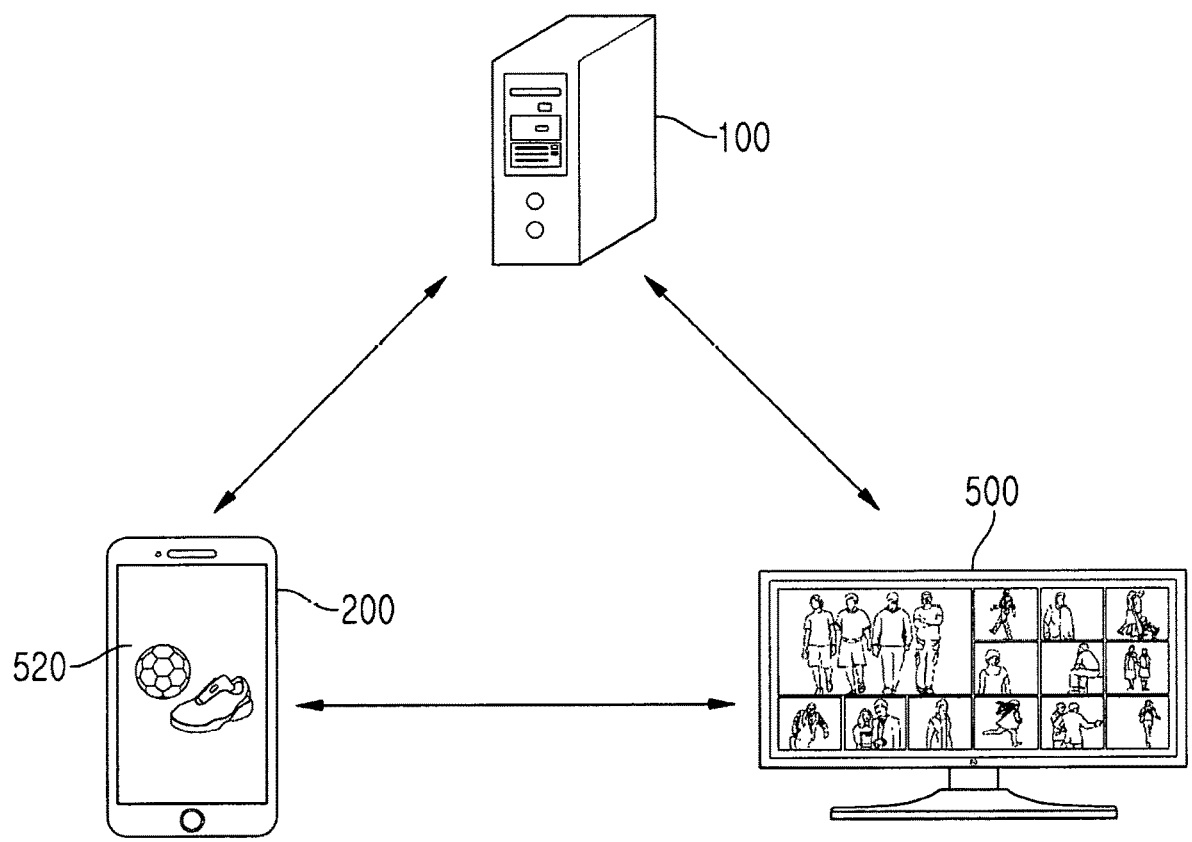
FIG. 6 is an exemplary drawing to explain the performance of the interaction between the user's mobile device and the information display device in accordance with a fourth example embodiment.

Further explanation will be made exemplarily by referring to FIGS. 4, 5, and 6. FIG. 4A and 4B are example drawings to explain that the interaction between the user and the other user is performed in accordance with SNS example embodiment and FIGS. 5A and 5B are example drawings to explain that the interaction between the user and the other user is performed in accordance with the financial example embodiment. FIG. 6 is an example drawing to explain the performance of the interaction between the user's mobile device and the information display device in accordance with the on-line shopping example embodiment.

As illustrated in FIGS. 4A and 4B, the user and the other user may perform an interaction for making SNS friends though their mobile devices 200 and 300. As illustrated in FIG. 4A, an image 410 relating to a SNS friend request may be displayed on the user's mobile device 200. The image 410 may include a profile photo uploaded to the user's SNS account, the user's name or nickname on the SNS account, a message for a friend request, etc. If the user takes a gesture of swiping the image 410 to the arrow-direction illustrated in FIG. 4A as a specified gesture, the data related to the interaction for making the SNS friend is transmitted to the other user's mobile device 300 and the image 410 (or an image whose contents are somewhat changed from the image 410 according to a situation of the other user) relating to the SNS friend request may also be displayed in the other user's mobile device 300 as illustrated in FIG. 4B. If the other user takes a touch gesture of swiping the image displayed on the mobile device 300 to the arrow-direction illustrated in FIG. 4B, the server may be allowed to update lists of SNS friends of the user and the other user stored in the user-originating information database.

The effective application of example of SNS USE will be explained by using the situation in which the user and the other user happen to see each other after a long interval while walking as an example. Under the situation, the user and the other user could give and receive contact numbers such as telephone number, email address, or SNS account information after asking after each other. In general, to give and receive contact numbers, they had to pull out, and hand over, their business card containing their contact numbers, or have to tell or listen to their contact numbers and then store the contact numbers in their mobile devices. To be SNS friends on the SNS such as facebook, they, furthermore, had to go through the seriously cumbersome procedures, including logging on the SNS, finding a friend, sending a friend request, and allowing the friend to accept the request. In accordance with one example embodiment, it, however, works with a very simple user interface because the user and the other user may become friends if they turn on the same SNS application and then the user takes a first swipe gesture through the user's own mobile device as if the user handed over the image to the other user the user faces and the other user takes a second swipe gesture through the other user's own mobile device as if the other user received the image. In other words, the cumbersome procedures, including the user finding the other user under the name of the other user on the SNS, selecting a certain user among searched different persons with the same name, sending a friend request, etc., may be omitted. Instead, the user may perform the interaction intuitively.

Meanwhile, it was explained in FIGS. 4A and 4B that the data related to the interaction for making the SNS friend is transmitted to the other user's mobile device, but the user's mobile device may receive the data related to the interaction for making the SNS friend from the other user's mobile device, of course.

As illustrated in FIG. 5A and 5B, the user and the other user may also perform an interaction for a financial transaction through their mobile devices 200 and 300. In this case, as illustrated in FIG. 5A, a bill-shaped image 420 may be displayed on the user's mobile device 200. If the user takes a touch gesture of swiping the bill-shaped image 420 in the arrow direction illustrated in FIG. 5A, the data related to the interaction for the financial transaction is transmitted to the other user's mobile device 300. It was explained in FIGS. 5A on assumption that the data related to the interaction for the financial transaction was transmitted to the other user's mobile device, but as the case may be, the user's mobile device could receive the data. As illustrated in FIG. 5B, the image same as the bill-shaped image 420 (or an image whose contents are somewhat changed from the image 420 according to a situation of the other user) transmitted from the user's mobile device 200 to the other user's mobile device 300 may be displayed. If the other user takes a touch gesture of swiping the bill-shaped image 420 in the arrow direction illustrated in FIG. 5B, the server 100 may be allowed to update the balance or transactions of the financial accounts of the user and the other user stored in the user-originating information database. At the time, the image 420 may be in the same shape as the currently used money for the intuitive recognition of the user. For example, if the user intends to perform an interaction for transferring USD 15 to the other user, after swiping the 10-dollar bill shaped image, the user may take a touch gesture of swiping a 5-dollar bill shaped image. In other words, the balance or the transactions of the financial account are allowed to be updated based on a gesture of handing over the money, i.e., a gesture the user is accustomed to, so that a sense of difference which the user accustomed to transactions through money exchange might feel when the user conducts Internet banking may be reduced.

The effective application of the example of financial use will be explained by using the situation in which the user pays back the money the user borrowed from the other user as an example. First of all, (i) the user and the other user turn on the same financial transaction-related application program; (ii) the user selects a bill-shaped image from the user's digital wallet (i.e., the financial transaction-related application) and swipes it to the first direction as if handing over a bill to the other user; and (iii) the other user draws the bill displayed on the other user's mobile device to the second direction as if the other user received the bill handed over by the user. Therefore, it can work with a very simple user interface. Because the existing method (e.g., NFC method) requires a mobile device to be placed physically close to another mobile device due to a much narrower operable scope in comparison with the procedures of (i), (ii), and (iii) and it did not have a significant feature of the example embodiments, i.e., a feature that the mobile devices can be wirelessly connected when the digital wallet applications of both users are turned on and they can pay and repay money even though both mobile devices are not physically contacted, it causes a lot of inconvenience. In accordance with the example embodiments, it is possible to reduce a sense of difference from the real life by allowing procedures similar to actions taken in the real life, e.g., actions of the user pulling out from the wallet and handing over money to the other and the other receiving and putting the money in his or her own pocket, to be performed. Accordingly, it may be used without any trouble even by users who are not familiar with smart devices.

As illustrated in FIG. 6, the user may also perform an interaction for an on-line shopping experience through the mobile device 200 and the information display device 500. In this case, as illustrated in FIG. 6, a product-shaped image 520 may be displayed on the user's mobile device 200. If the user takes a touch gesture of tapping the product-shaped image 520, the data related to the interaction for the shopping is transmitted to the user's mobile device 300 from the information display device 500. The data may be shopping information on product, pricing, consumer review/rating, or seller that is supplementary to the content displayed on the information display device 500. It was explained in FIG. 6 on assumption that the data related to the interaction for the on-line shopping was transmitted to the user's mobile device 200 from the information display device 500, but as the case may be, the information display device could receive the data. If the user takes a touch gesture of tapping the touch panel, the server 100 may be allowed to update the data of the shopping of the user and the seller stored in the user originating information database. For example, if the user intends to perform an interaction for ordering a product, after tapping the product-shaped image, the user may take a touch gesture of tapping the 1-click ordering button on the touch panel. In other words, the data of shopping are allowed to be updated based on a gesture of tapping the button, i.e., a gesture the user is accustomed to, so that a sense of convenience which the user accustomed to mobile environment might feel may be applied to on-line shopping.

The effective application of the example of shopping will be explained by using the situation in which the user orders the product related to the content displayed on the information display device as an example. The product may be related to the content directly or indirectly, for example, album or fashion item of the musician of background music of a TV drama show may be the product. First of all, (i) the user turn on the shopping-related application program and a product-shaped image related to the content displayed on the information display device is transmitted; (ii) the user touches the product-shaped image and shopping information such as product, price, consumer review/rating and seller is also transmitted; (iii) the user taps a 1-click ordering button; and (iv) the seller is ordered for delivering the product to the user. Because the existing method requires a server to make sync (no time delay) for contents displayed in a mobile device and an information display device, it did not have a significant feature of example embodiments, i.e., a feature that the mobile device can be wirelessly connected to the information display device and obtains supplementary information in real time. Accordingly, it may be used without any trouble for sync that may cause inconvenience for on-line shopping.

It was explained that the server 100 is instructed to update information originating from the user and the other user stored in the user-originating information database by referring to the data related to the specific interaction if a gesture of swiping an image by the other user in FIGS. 4A, 4B, 5A and 5B. However, as the case may be, if other touch gesture of the user is detected, the server 100 can be instructed to update based on the data as well.

How the information originating from at least either the user and the other user is updated through the server by the user-originating information update instructing part 240 will be found out through detailed explanation about the server 100 below.

Next, the communication part may perform a function of allowing data transmission and reception to/from the server 100 and the other user's mobile device 300.

Finally, the control part 250 may perform a function of controlling data flow among the touch screen 210, the interaction target searching part 220, the interaction initiating part 230, the user-originating information update instructing part 240, and the communication part. In other words, the control part 250 may control the flow of data from/to outside or among the components of the mobile device 200 and thereby allow the touch screen 210, the interaction target searching part 220, the interaction initiating part 230, the user-originating information update instructing part 240, and the communication part to perform their unique functions.

Configuration of the Server

The internal configuration of the server and functions of their components will be explained.

FIG. 3 is a drawing representing the internal configuration of the server to change at least either of the first user and the second user with the support of the first mobile device of the first user and the second device of the second user in accordance with an example embodiment.

As illustrated in FIG. 3, the server 100 may be configured to include a database accessing part 110, an interaction information collecting part 120, an update performing part 130, an application providing part 140, a communication part 150, and a control part 160. At least some of the database accessing part 110, the interaction information collecting part 120, the update performing part 130, the application providing part 140, the communication part 150 and the control part 160 may be program modules communicating with the mobile devices 200 and 300. Such program modules may be included in the server in a form of an operating system, an application program module and other program modules or physically stored in various storage devices well known to those skilled in the art. In addition, they may be stored in a remote storage device capable of communicating with the server. The program modules may include but not be subject to a routine, a subroutine, a program, an object, a component, and a data structure for executing a specific operation or a type of specific abstract data that will be described.

First of all, the database accessing part 110 may perform a function of accessing the user-originating information database where information originating from the first and the second users is stored.

In the specification, the information originating from the first and the second users may be stored in the user-originating information database. In other words, information such as information on SNS accounts of the first and the second users, lists of friends in their respective SNS accounts, their financial account numbers, balance, address books (which are interacted between the user-originating information database and mobile devices) stored in their respective mobile devices, and types and number of coupons held by the first and the second users may be stored in the user-originating information database and each information may be stored in different databases. Both the user's and the seller's information such as ID, ordering history, and financial account may be stored as data for the shopping information.

In addition, the user-originating information database may be configured to be included or separate from the server. In example embodiments, the user-originating information database as a concept of including a computer-readable recording medium may include not only a narrow meaning of database but also a wide a broad meaning of database such as data record based on file systems. From the aspect, it may be understood that, even a set of logs may be included in the database part 240 if it can be browsed and data can be extracted from the set.

Next, if the first mobile device 200 searches the second mobile device(s) 300 as a target to perform the specific interaction within a predetermined distance from the location of the first mobile device 200 or searches the second mobile device(s) connected to an AP or a base station of a cellular network to which the first mobile device 200 is connected and a specific second mobile device is selected among the searched second mobile device(s) and then a specified touch gesture is detected in the first mobile device 200, the interaction information collecting part 120 may perform a function of receiving the data related to the specific interaction from the second mobile device 300 or transmitting the data related to the specific interaction to the second mobile device 300. As described before, the data related to the specific interaction could include only the instruction data which instructs to be able to start the whole procedure of interaction. The update performing part 130 may perform a function of instructing the information originating from at least either of the first and the second users stored in the user-originating information database to be updated by referring to the data related to the specific interaction collected through the interaction information collecting part 120.

More specifically, if the data related to the interaction for making the first and the second users be SNS friends with each other is collected, the update performing part 130 may instruct a list of SNS friends of the first user or the second user to be updated by referring to collected information on the SNS account of the first user or the second user. In other words, it may instruct the second user to be added as a SNS friend in the list of SNS friends of the first user and the first user to be added as a SNS friend in the list of SNS friends of the second user.

If the data related to the interaction for a financial transaction is collected, the update performing part 130 may instruct the balance or the transactions of the financial account of at least either of the first user and the second user to be updated by referring to the transaction amount and the information on the financial accounts of the first user and the second user. Herein, the financial account information may include information on financial account number, balance, etc. For example, if the interaction for making USD 10 paid from the first user to the second user is performed, the update performing part 130 may instruct the balance of the financial account of the first user to be the amount subtracting USD 10 and instruct that of the second user to be the amount increasing USD 10.

If data on a business card is collected, the update performing part 130 may instruct the address book of at least either of the first user and the second user to be updated. For example, if the interaction for making the name card of the first user transmitted from the first user to the second user is performed, the update performing part 130 may instruct the list of the first user to be added in the address book of the second user stored in the user-originating information database and instruct the address book stored in the second mobile device 300 to be updated together by interacting the mobile device 300 of the second user and the user-originating information database with each other.

If information on a coupon as the data related to the specific interaction is collected, the update performing part 130 may instruct information on the coupon of at least of the first user and the second user to be updated. For example, if the interaction for making the coupon transmitted from the first user to the second user is performed, the update performing part 130 may instruct the number of coupons held by the second user to be increased and, at the same time, instruct the number of coupons held by the first user to be reduced, as the case may be.

Lastly, if data on shopping is collected, the update performing part 130 may instruct the product order for the user. As the case may be, if the interaction for ordering a product of USD 10 is performed, the update performing part 130 may instruct the balance of the financial account of the user to be the amount subtracting USD 10 and instruct that of the seller to be the amount increasing USD 10.

The application providing part 140 may perform a function of providing an application capable of providing interfacing service which relates to a user-originating information and changing the user-originating information to the first mobile device 200 and the second mobile device 300. By referring to the information on the application program installed or run in the first mobile device 200 and the second mobile device 300, it has been said above that the first mobile device 200 may search and select the specific second mobile device 300 of the second user as the target to perform the specific interaction. The application providing part 140 may be configured to be included in, or separate from, the server.

Next, the communication part 150 may perform a function of allowing data from and/or to the database accessing part 110, the interaction information collecting part 120, the update performing part 130, the application providing part 140, and the user-originating information database to be transmitted and received.

Lastly, the control part 160 may perform a function of controlling data flow among the database accessing part 110, the interaction information collecting part 120, the update performing part 130, the application providing part 140, and the communication part 150. In other words, the control part 160 may control the flow of data from/to outside or among the components of the server 100 and thereby allow the database accessing part 110, the interaction information collecting part 120, the update performing part 130, the application providing part 140, and the communication part 150 to perform their unique functions.

Example embodiments may bring the effect of easily searching the mobile device of the other user which can perform the interaction with the user.

In accordance with example embodiments, if the gesture of swiping the image displayed on the mobile device is detected as the specified touch gesture, the effect of simplifying the course of the interaction with the other user by using the mobile device may be achieved by updating the information originating from the user which is related to the other.

In accordance example embodiments, if an interaction for making the user and the other user become SNS friends is performed, when the application installed in both the mobile devices of the user and the other user is turned on, the interaction becomes possible as well. At the state, because the user and the other user may become SNS friends with each other by simple swipe gesture, the cumbersome procedures, including searching the other user under the name of the other user on SNS, selecting a person who corresponds to the other user among the searched persons with the same name, and sending a friend request, may be omitted. The effect of performing an interaction intuitively may be achieved.

In accordance with example embodiments, if the financial transaction is performed between the user and the other user, when the application installed in the mobile devices is turned on, the interaction becomes possible between the mobile devices. At the state, just with the simple swipe gesture (even though both mobile devices are not physically contacted or nearly contacted), the effect of financial transactions between the user and the other user may be achieved. The mobile device of the user or the other user may be used as a point-of-sale (POS) terminal or as a device exclusive for POS. In both cases, all the mobile devices may play roles to activate financial transactions.

In accordance with example embodiments, on assumption that a financial transaction in which the user opens the wallet, pulls out money corresponding to transaction amount, and pays the money to the other user and the other user opens the wallet, and puts the received money in it in real life is mimicked on the mobile device, by making the user's actions of opening the wallet and paying the other user the money equal to the transaction amount by pulling out from the wallet correspond to those of running a digital wallet app in the mobile device and sending the money to the other user through a fixed entry in the digital wallet app, e.g., sending the money to the other user by the swipe gesture, respectively and making the other user's actions of opening the wallet and putting the received money in the wallet correspond to those of opening the digital wallet app and depositing the received transaction amount to the other user's account in the other user's financial institute interacted with the other user's mobile device, the size of the artificial effort (load) generated at each stage while setting the number of actions for the financial transaction of the user and the other user to be equal may be reduced to achieve the financial transaction via the mobile device with minimum interruption. These may reduce the sense of difference of users who are familiar with real financial transactions in such financial transactions via mobile devices.

Figure 7:
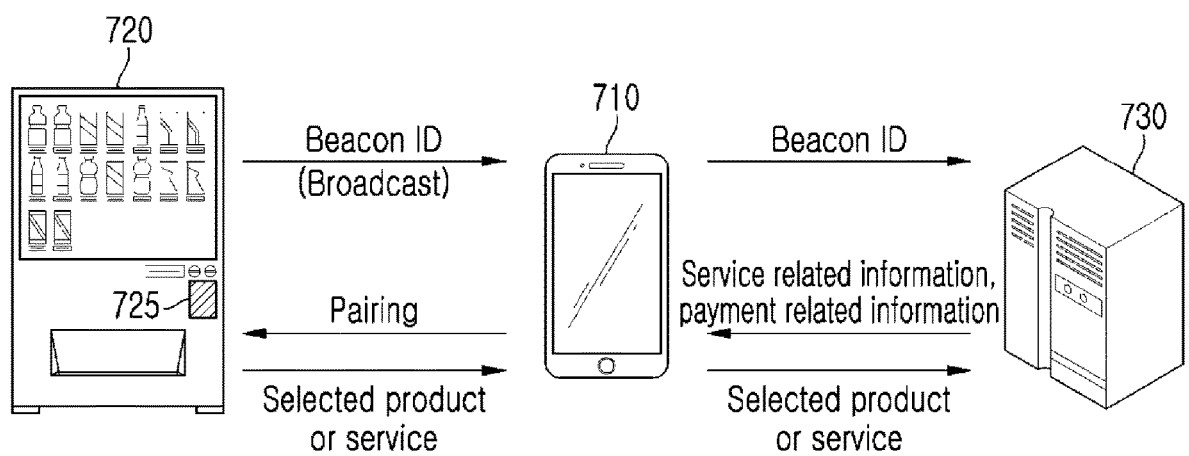
FIG. 7 is an exemplary drawing to explain a method of changing information originating from a user based on a user interaction relative to a communication device using a mobile device and a mobile device in accordance with an example embodiment.

FIG. 7 is an example drawing to explain a method of changing information originating from a user based on a user interaction on a communication device using a mobile device and a mobile device in accordance with an example embodiment.

A method of identifying a communication device 720 through a mobile device 710 of a user and changing user-originating information of the user stored in a server 730 (or other device) in response to an input of a specific interaction on the communication device 720 will be described by referring to FIG. 7.

In the illustrated example of FIG. 7, the mobile device 710, the communication device 720, and the server 730 may correspond to the first mobile device 200, the second mobile device 300, and the server 100 described by referring to FIGS. 1 through 6, respectively.

In the illustrated example, the communication device 720 may be a device configured to sell products or services. For example, the communication device 720 may be a vending machine configured to sell products or services or a communication device attached to or included in the vending machine.

The communication device 720 may indicate a device that includes an object 725 for short-range wireless communication (SRWC) (hereinafter, referred to as SRWC object 725), or may be the SRWC object 725 itself. The SRWC object 725 may be a beacon that includes a communication module to establish a communication channel (i.e., wireless communication connection) between the mobile device 710 and the communication device 720. The communication module may be, for example, a Bluetooth communication module or a 5G communication module, or NFC module. Any type of communication modules that enable pairing between the mobile device 710 and the communication device 720 may be used. The SRWC object 725 may be configured to attach to a vending machine and broadcast identification information of the vending machine. In the following, explanation will be made without particularly distinguishing the communication the device 720 and the SRWC object 725 from each other.

Hereinafter, operations of the mobile device 710, the communication device 720, and the server 730 will be further described.

The communication device 720 may broadcast identification information of the communication device 720, and the mobile device 710 may identify the communication device 720 by receiving the broadcasted identification information (e.g., a beacon ID) of the communication device 720. The mobile device 710 may transmit the received identification information of the communication device 720 to the server 730.

The server 730 may transmit information on a service (e.g., a product or a service to be sold or provided through the communication device 720, or a payment service thereof) associated with the communication device 720 based on the received identification information of the communication device 720.

Meanwhile, the mobile device 710 may complete pairing with the communication device 720. Once the pairing is completed, the user of the mobile device 710 may select a desired product or a desired service among products or services sold or provided through the communication device 720 by inputting a specific interaction on the communication device 720. Information on the selected product or service may be transferred from the communication device 720 to the server 730 through the mobile device 710. The server 730 may request the payment by transferring payment related information to the mobile device 710 based on the selected product or service, and may update information originating from the user (i.e., user-originating information) of the mobile device 710 in response to processing and completing of the payment. Once the payment is completed, the user may receive the selected product or service.

That is, the user may identify the communication device 720 corresponding to the vending machine through the mobile device 710, may enable paring between the communication device 720 and the mobile device 710, and may perform the payment for the product or the service purchased through the vending machine using the mobile device 710 (i.e., through the service provided from the mobile device 710). Information originating from the user according to the payment may be automatically updated on the server 730. After updating the payment information, the user may be provided with the selected product or service by the communication device 720. For example, the vending machine may dispense the selected product to the user.

The explanation relating to the technical features made by referring to FIGS. 1 through 6 may be applicable to FIG. 7 and thus duplicate explanation is omitted herein. For example, the mobile device 710 may allow the user may purchase a product and/or a service without bills, coins or credit cards, and facilitate the communication device 720 processing the payment. Therefore, user convenience may be improved by automatically updating/managing the user-originating information in accordance with the processed payment.

Figure 8:
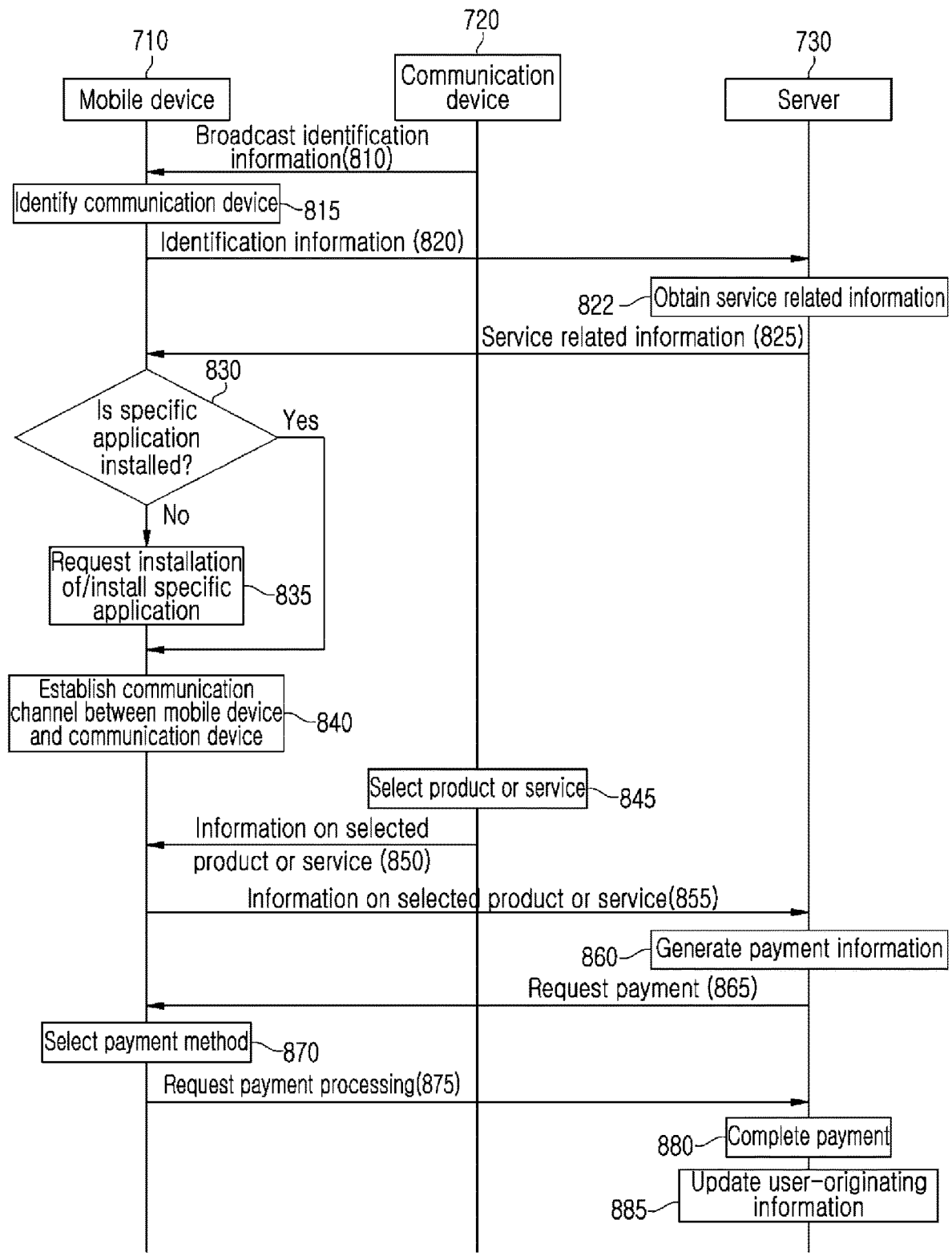
FIG. 8 is a signal flowchart illustrating transmission and reception of information/data among a mobile device, a communication device, and a server in accordance with an example embodiment.

FIG. 8 is a signal flowchart illustrating transmission and reception of information/data among a mobile device, a communication device, and a server in accordance with an example embodiment.

A method of changing information originating from a user according to operations of the mobile device 710, the communication device 720, and the server 730 of FIG. 7 will be further described by referring to FIG. 8.

In operation 810, the communication device 720 may broadcast identification information of the communication device 720. The identification information of the communication device 720 may be a beacon ID of a beacon corresponding to the communication device 720. The beacon ID may correspond to or include identification information, for example, a vending machine ID, of a vending machine to which the corresponding beacon is attached. However, example embodiments are not limited thereto.

In operation 815, the mobile device 710 may identify the communication device 720 present within a desired (or, alternatively, a predetermined) distance. For example, the mobile device 710 may identify the communication device 720 by receiving the identification information of the communication device 720 that is broadcasted from the communication device 720 present within the desired (or, alternatively, the predetermined) distance. For example, a communicator of the mobile device 710 may include a Bluetooth communication module and may identify the communication device 720 by scanning or searching at least one communication device 720 capable of being paired with the mobile device 710 using the Bluetooth communication module. The desired (or, alternatively, the predetermined) distance may be a maximum distance within which the mobile device 710 may receive data broadcasted from the communication device 720. The identified communication device 720 may be a target to perform a specific interaction for changing user-originating information.

For example, the mobile device 710 may identify the communication device 720 when a user with the mobile device 710 passes by the communication device 720 present within the desired (or, alternatively, the predetermined) distance. The presence of the communication device 720 may be notified to the mobile device 710 through, for example, a pop-up window, etc.

In operation 820, the mobile device 710 may transmit the received identification information of the communication device 720 to the server 730.

In operation 822, the server 730 may obtain information on a service associated with the communication device 720 based on the received identification information of the communication device 720. For example, the server 730 may obtain information on a company of a vending machine corresponding to the identification information or a service or a product sold through the vending machine based on the received identification information of the communication device 720. Alternatively, information on the service associated with the communication device 720 may include information used to provide a payment service for the service or the product being sold through the vending machine. However, example embodiments are not limited thereto.

In operation 825, the mobile device 710 may receive information on the service associated with the communication device 720 from the server 730. The received information on the related service may be information used for a specific application. For example, information on the service may include open account information or official account information for providing the service in association with a messenger application program. An open account or an official account may be an account for providing information on the company of the vending machine or the service or the product being sold through the vending machine. Alternatively, the open account or the official account may be an account for providing a payment service for the service or the product being sold through the vending machine.

Alternatively, at least a portion of functions of the received information on the related service may be information available in a web app. The aforementioned specific application may be required to use all of the functions of the received information on the related service.

In operation 830, the mobile device 710 may determine whether the specific application for using the information on the service received from the server 730 is installed therein. If the messenger application program corresponding to the specific application is not installed in the mobile device 710, the mobile device 710 may receive a request to install the messenger application program therein from the server 730 or other server associated with the installation of the messenger application program. For example, the mobile device 710 may output a pop-up window that requests installation of the messenger application program on a screen and may provide connection to appstore, etc., for installation of the messenger application program. However, example embodiments are not limited thereto.

If the messenger application program is installed in the mobile device 710 and the aforementioned open account or official account is added as a friend, the service associated with the communication device 720 may be provided through the open account or the official account.

In operation 840, the mobile device 710 may establish a communication channel with the communication device 720. Establishment of the communication channel may indicate establishing a channel that enables wireless communication, and may indicate, for example, that pairing between the mobile device 710 and the communication device 720 is completed.

The communication channel may be established when a specific touch gesture is detected by the mobile device 710. For example, a pop-up window asking whether to complete pairing with the communication device 720 may be displayed on the mobile device 710, and pairing between the mobile device 710 and the communication device 720 may be completed by approving the completion through a touch input on the displayed pop-up window.

Pairing between the mobile device 710 and the communication device 720 may be performed when information is received from the server 730 in operation 825 or after receiving the corresponding information. Alternatively, pairing between the mobile device 710 and the communication device 720 may be performed before receiving the information from the server 730 in operation 825 (e.g., after identifying the communication device 720 in operation 815).

The communication device 720 paired with the mobile device 710 may be configured to communicate with the mobile device 710 and to not communicate with the server 730.

In operation 845, the communication device 720 may receive a selection on a product or a service from the user of the mobile device 710. For example, the communication device 720 may receive a selection (i.e., a selection from the user on a product or a service that the user desires to purchase) from the user on a product or a service being sold at the vending machine which the communication device 720 is attached to or included in. The specific interaction may include the selection from the user on the product or the service. The selection may be directly implemented on the vending machine or the communication device 720. The input of the specific interaction on the communication device 720 and transmission of data related to the specific interaction to the communication device 720 may be performed using a specific interaction related program of the communication device 720.

Alternatively, the selection may be indirectly implemented through the mobile device 710. In this case, operation 850 may be omitted.

In operation 850, the mobile device 710 may receive data including information on the product or the service selected by the user as specific interaction related data from the communication device 720. Information on the product or the service selected by the user may correspond to information on the product or the service of which a payment is requested to the server 730 as information on the product or the service that the ser desires to purchase.

In operation 855, the mobile device 710 may transmit the received specific interaction related data to the server 730. That is, the mobile device 710 may transmit, to the server 730, data including information on the product or the service selected by the user.

In operation 860, the server 130 may generate payment information on the product or the service selected by the user based on the received information. The payment information may include information that requests the mobile device 710 for the payment for the product or the service selected by the user.

In operation 865, the mobile device 710 may receive the payment request for the product or the service selected by the user from the server 730.

In operation 870, the mobile device 710 may receive a selection on a a desired (or, alternatively, a predetermined) payment method from the user in response to the payment request. For example, a service for the payment may be provided through the specific application (messenger application program) and the user may select the payment method by selecting a user interface corresponding to each payment method displayed through the corresponding specific application. The payment method may be selected as at least one of a cash payment, a credit card payment (a direct payment or a payment using a credit card registered to the mobile device 710 or the messenger application program), a payment using e-currency, and a payment using a point.

In operation 875, the mobile device 710 may request the server 730 for payment processing for the product or the service selected by the user based on the selected payment method. Here, information such as authentication information (input through the mobile device 710) requested for payment processing by the server 730 may be transferred to the server 730.

If at least a portion of an amount of the product or the service is directly paid to the vending machine with cash or credit card, the mobile device 710 may receive information on the corresponding paid amount from the communication device 720, and the mobile device 710 may transfer the received information on the paid amount to the server 730. Here, payment processing about a remaining amount may be performed in the server 730.

In operation 880, the server 730 may complete payment processing for the selected product or service based on the payment method selected by the user and information including the authentication information.

In operation 885, the server 730 may update user-originating information stored in the server 730 or in a storage device interacting with the server 730 based on the specific interaction related data (i.e., information on the product or the service selected by the user). The user-originating information may be automatically updated in response to the completion of the aforementioned payment processing. The user-originating information may include balance or transaction information of a financial account of the user, balance or point transaction information of the point. The user-originating information may be appropriately updated by applying contents of the payment in response to the completion of the payment processing according to the user purchase on the product or the service.

Once the payment is completed, the user may receive the paid product or service.

Transmission and reception of information/data of the mobile device 710 may be performed through the communicator of the mobile device 710, and the operation (the aforementioned operation) of the mobile device 710 may be performed through the controller or the processor. Also, transmission and reception of information/data of the server 730 may be performed through the communicator of the server 730, and the operation (the aforementioned operation) of the server 730 may be performed through a controller or a processor.

To perform the above-described purchase and payment of a product or a service based on a specific interaction and update of user-originating information, the specific interaction related application program may need to be executed in the mobile device 710. It will do as long as the application program is running either background or foreground of the mobile device 710. The specific application program may correspond to the messenger application program.

The explanation relating to the technical features made by referring to FIGS. 1 through 7 may be applicable to FIG. 8 and thus duplicate explanation is omitted herein.

Example embodiments as explained above can be implemented in a form of executable program command through a variety of computer means recordable to computer readable media. The computer readable media may include solely or in combination, program commands, data files, and data structures. The program commands recorded to the media may be components specially designed for example embodiments or may be usable to a skilled person in a field of computer software. Computer readable record media include magnetic media such as hard disk, floppy disk, and magnetic tape, optical media such as CD-ROM and DVD, magneto-optical media such as floptical disk and hardware devices such as ROM, RAM, and flash memory specially designed to store and carry out programs. Program commands include not only a machine language code made by a complier but also a high level code that can be used by an interpreter etc., which is executed by a computer. The aforementioned hardware device can work as more than a software module to perform the operations included in the example embodiments and they can do the same in the opposite case.

As seen above, the example embodiments have been explained by specific matters such as detailed components, limited embodiments, and drawings. While the example embodiments have been shown and described with respect to some example embodiments, it, however, will be understood by those skilled in the art that various changes and modification may be made without departing from the spirit and scope of the example embodiments as defined in the following claims.

Accordingly, the example embodiments must not be confined to the explained embodiments, and the following patent claims as well as everything including variations equal or equivalent to the patent claims pertain to the category of the thought of the example embodiments.

According to one or more example embodiments, the units and/or devices described above, such as the components of the mobile device 200 including the interaction target searching part 220, the interaction initiating part 230, the user-originating information update instructing part 240, the communication part (non-illustrated), and the control part 250 may be implemented using hardware, a combination of hardware and software, or a non-transitory storage medium storing software that is executable to perform the functions of the same. These components may be embodied in the same hardware platform or in separate hardware platforms.

Hardware may be implemented using processing circuity such as, but not limited to, one or more processors, one or more Central Processing Units (CPUs), one or more controllers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUs), one or more microprocessors, one or more Application Specific Integrated Circuits (ASICs), or any other device or devices capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, etc., capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., one or more processors, CPUs, controllers, ALUs, DSPs, microcomputers, microprocessors, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor. In another example, the hardware device may be an integrated circuit customized into special purpose processing circuitry (e.g., an ASIC).

Storage media may also include one or more storage devices at units and/or devices according to one or more example embodiments. The one or more storage devices may be tangible or non-transitory computer-readable storage media, such as random access memory (RAM), read only memory (ROM), a permanent mass storage device (such as a disk drive), and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media.

The computer programs, program code, instructions, or some combination thereof, may be loaded into the one or more storage devices and/or the one or more computer processing devices from a remote data storage device via a network interface, rather than via a computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the storage media, the computer programs, program code, instructions, or some combination thereof, may be specially designed and constructed for the purposes of the example embodiments, or they may be known devices that are altered and/or modified for the purposes of example embodiments.

What is claimed is:

1. A non-transitory computer-readable medium including computer readable instructions, which when executed, cause at least one processor of a mobile device of a user to execute an application program in one of a background and foreground of the mobile device to,
    identify at least one communication device within a first distance from the mobile device as a target to perform a specific interaction to change user-originating information by, receiving a beacon broadcast from the communication device prior to establishing a communication channel with the communication device, the beacon including identification information identifying the communication device, transmitting the identification information to a server such that the mobile device relays the identification information broadcast by the communication device to the server, and receiving information on a service associated with the communication device from the server, establish the communication channel with the communication device through pairing the mobile device with the communication device in response to detection of a specified touch gesture on a screen associated with the mobile device prior to establishing the communication channel, receive, from the communication device, data related to the specific interaction in response to the user providing an input to the communication device, and transmit, to the server, the data related to the specific interaction to instruct the server to update user information stored in the server or a storage device interacted with the server based on the data related to the specific interaction, wherein the communication device is configured to communicate with the server only indirectly via with the mobile device such that the communication device does not directly communicate with the server.

2. The non-transitory computer-readable medium of claim 1, wherein the application program is a messenger application program that, when executed, configures the processor to exchange messages between the communication device and the mobile device, and the information on the service received from the server includes account information for providing the service in association with the messenger application program.

3. The non-transitory computer-readable medium of claim 2, wherein the non-transitory computer-readable medium, when executed, further configures the processor to, output a request to install the messenger application program on the mobile device in response to determining that the messenger application program is not installed in the mobile device.

4. The non-transitory computer-readable medium of claim 1, wherein the data related to the specific interaction includes information on a product or a service selected by the user.

5. The non-transitory computer-readable medium of claim 4, wherein the non-transitory computer-readable medium, when executed, further configures the processor to communicate with the communication device via a short-range wireless communication device associated with the communication device, and wherein the communication device is included in a vending machine that sells the product or the service such that the specific interaction is a selection from the user on the product or the service that is sold by the vending machine.

6. The non-transitory computer-readable medium of claim 4, wherein the non-transitory computer-readable medium, when executed, further configures the processor to, receive a payment request for the product or the service from the server, receive a selection of a payment method from the user in response to the payment request, request payment processing for the product or the service based on the payment method, and instruct the server to update the user information in response to completion of the payment processing.

7. The non-transitory computer-readable medium of claim 6, wherein the payment method is selected from among a cash payment method, a credit card payment method, a payment method using electronic currency, and a payment method using a point.

8. The non-transitory computer-readable medium of claim 1, wherein the specific touch gesture is a touch input by the user on a pop-up window displayed on the mobile device.

9. The non-transitory computer-readable medium of claim 1, wherein upon the server updating the user information, the communication device is instructed to dispense a product or service to the user based on the data related to the specific interaction.

10. The non-transitory computer-readable medium of claim 1, wherein the non-transitory computer-readable medium, when executed, configures the processor to, determine whether the application program supported by the communication device is installed in the mobile device based on the information on the service, output a request to the user to install the application program on the mobile device in response to determining that the application program is not installed in the mobile device, establish the communication channel with the communication device after successfully installing the application program on the mobile device, and communicate, via the application program, with the communication device over the communication channel to relay messages between the communication device and the server.

11. The non-transitory computer-readable medium of claim 1, wherein the non-transitory computer-readable medium, when executed, configures the processor to, establish the communication channel with the communication device after the application program is successful installed on the mobile device, and receive, from the communication device, the data related to the specific interaction using the application program successfully installed on the mobile device.

12. A mobile device comprising:

a memory configured to store an application program; and at least one processor configured to execute the application program in one of a background and foreground of the mobile device to, identify at least one communication device within a first distance from the mobile device as a target to perform a specific interaction to change user-originating information by, receiving a beacon broadcast from the communication device prior to establishing a communication channel with the communication device, the beacon including identification information identifying the communication device, transmitting the identification information to a server such that the mobile device relays the identification information broadcast by the communication device to the server, and receiving information on a service associated with the communication device from the server, establish the communication channel with the communication device through pairing the mobile device with the communication device in response to detection of a specified touch gesture on a screen associated with the mobile device prior to establishing the communication channel, receive, from the communication device, data related to the specific interaction in response to a user providing an input to the communication device, and transmit, to the server, the data related to the specific interaction to instruct the server to update user information stored in the server or a storage device interacted with the server based on the data related to the specific interaction, wherein the communication device is configured to communicate with the server only indirectly via with the mobile device such that the communication device does not directly communicate with the server.

13. The mobile device of claim 12, wherein the data related to the specific interaction includes information on a product or a service selected by the user.

14. The mobile device of claim 13, wherein the application program, when executed, configures the at least one processor to communicate with the communication device via a short-range wireless communication device associated with the communication device, and wherein
the communication device is included in a vending machine that sells the product or the service such that the specific interaction is a selection from the user on the product or the service that is sold by the vending machine.

15. The mobile device of claim 13, wherein the application program, when executed, configures the at least one processor to,
receive a payment request for the product or the service from the server,
receive a selection of a payment method from the user in response to the payment request,
request payment processing for the product or the service based on the payment method, and
instruct the server to update the user information in response to completion of the payment processing.

16. The mobile device of claim 12, wherein the application program, when executed, configures the at least one processor to,
establish the communication channel with the communication device after the application program is successful installed on the mobile device, and
receive, from the communication device, the data related to the specific interaction using the application program successfully installed on the mobile device.

17. The mobile device of claim 12, wherein the application program, when executed, configures the at least one processor to,
determine whether the application program supported by the communication device is installed in the mobile device based on the information on the service,
output a request to the user to install the application program on the mobile device in response to determining that the application program is not installed in the mobile device,
establish the communication channel with the communication device after successfully installing the application program on the mobile device, and
communicate, via the application program, with the communication device over the communication channel to relay messages between the communication device and the server.

18. A method of operating a mobile device, the mobile device including at least one processor to execute an application program in one of a background and foreground of the mobile device, the method comprising:
identifying at least one communication device within a first distance from the mobile device as a target to perform a specific interaction to change user-originating information by,
receiving a beacon broadcast from the communication device prior to establishing a communication channel with the communication device, the beacon including identification information identifying the communication device,
transmitting the identification information to a server such that the mobile device relays the identification information broadcast by the communication device to the server, and
receiving information on a service associated with the communication device from the server,
establishing the communication channel with the communication device through pairing the mobile device with the communication device in response to detection of a specified touch gesture on a screen associated with the mobile device prior to establishing the communication channel,
receiving, from the communication device, data related to the specific interaction in response to a user providing an input to the communication device, and
transmitting, to the server, the data related to the specific interaction to instruct the server to update user information stored in the server or a storage device interacted with the server based on the data related to the specific interaction
wherein the communication device is configured to communicate with the server only indirectly via with the mobile device such that the communication device does not directly communicate with the server.

19. The method of claim 18 further comprising:
communicating with the communication device via a short-range wireless communication device associated with the communication device, and wherein
the data related to the specific interaction includes information on a product or a service selected by the user, and
the communication device is included in a vending machine that sells the product or the service such that the specific interaction is a selection from the user on the product or the service that is sold by the vending machine.

20. The method of claim 18, wherein
the establishing establishes the communication channel with the communication device after the application program is successful installed on the mobile device, and
the receiving the data receives, from the communication device, the data related to the specific interaction using the application program successfully installed on the mobile device.

21. The method of claim 18, further comprising:
determining whether the application program supported by the communication device is installed in the mobile device based on the information on the service;
outputting a request to the user to install the application program on the mobile device in response to determining that the application program is not installed in the mobile device;
establishing the communication channel with the communication device after successfully installing the application program on the mobile device; and communicating, via the application program, with the communication device over the communication channel to relay messages between the communication device and the server.

* * * * *